US011531240B2

(12) United States Patent
Zhang et al.

(10) Patent No.: US 11,531,240 B2
(45) Date of Patent: Dec. 20, 2022

(54) FOLDING SCREEN DISPLAY DEVICE

(71) Applicants: Beijing BOE Display Technology Co., Ltd., Beijing (CN); BOE Technology Group Co., Ltd., Beijing (CN)

(72) Inventors: Yu Zhang, Beijing (CN); Zhuolong Li, Beijing (CN); Guangyun Tong, Beijing (CN); Bochang Wang, Beijing (CN); Zhanchang Bu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 27 days.

(21) Appl. No.: 17/357,112

(22) Filed: Jun. 24, 2021

(65) Prior Publication Data

US 2022/0163835 A1    May 26, 2022

(30) Foreign Application Priority Data

Nov. 20, 2020 (CN) .......................... 202011308524.9

(51) Int. Cl.
*G09G 3/36* (2006.01)
*G02F 1/1345* (2006.01)

(52) U.S. Cl.
CPC ........ *G02F 1/13452* (2013.01); *G09G 3/3611* (2013.01); *G09G 2310/08* (2013.01)

(58) Field of Classification Search
CPC .. G02F 1/1336; G02F 1/13452; G06F 1/1616; G06F 1/1647; G06F 1/1652; G09F 9/301; G09G 2310/08; G09G 3/3611
See application file for complete search history.

(56) References Cited

U.S. PATENT DOCUMENTS

2011/0141042 A1* 6/2011 Kim .................... G02F 1/13338
345/173
2019/0384078 A1* 12/2019 Wang .................... G02F 1/1309

FOREIGN PATENT DOCUMENTS

| CN | 2804454 Y | 8/2006 |
| CN | 108230906 A | 6/2018 |

* cited by examiner

*Primary Examiner* — Insa Sadio
(74) *Attorney, Agent, or Firm* — Workman Nydegger

(57) ABSTRACT

The present disclosure discloses a folding screen display device, and the folding screen display device includes: a main cell and a sub cell arranged in a stacked mode; a backlight module arranged on a side, facing away from the main cell, of the sub cell; a display control circuit board arranged on a side, facing away from the sub cell, of the backlight module; and a cable pinboard arranged on a side frame of the backlight module; where the display control circuit board has a timer control circuit for outputting a timer control signal to the main cell and the sub cell; the timer control circuit is electrically connected with the main cell through a first COF; the timer control circuit is electrically connected with the cable pinboard; and the cable pinboard is electrically connected with the sub cell through a second COF.

14 Claims, 4 Drawing Sheets

FOLDING SCREEN DISPLAY DEVICE

CROSS-REFERENCE TO RELATED APPLICATIONS

The present application claims priority to the Chinese Patent Application No. 202011308524.9, filed to the China Patent Office on Nov. 20, 2020 and entitled "FOLDING SCREEN DISPLAY DEVICE", the entire contents of which are incorporated herein by reference.

FIELD

The present disclosure relates to the technical field of display, in particular to a folding screen display device.

BACKGROUND

A displayed image of a liquid crystal display (LCD) has the advantages of large size, high resolution ratio and exquisite graphics details, and also has the disadvantages of insufficient color gamut, slow response speed and low contrast ratio. For LCD display, a folding screen display technology with an ultra-high contrast ratio is provided, and the contrast ratio may be greater than 1000000:1, enabling the displayed image of the LCD to rival an organic light-emitting diode (OLED). At the same time, the folding screen display technology has great advantages in detail quality, large size, resolution ratio, reliability, cost and power consumption and is widely used in TV, MNT, vehicles, medical, AR/VR and other fields.

SUMMARY

The embodiment of the present disclosure provides a folding screen display device, including: a main cell and a sub cell arranged in a stacked mode; a backlight module located on a side, facing away from the main cell, of the sub cell; a display control circuit board located on a side, facing away from the sub cell, of the backlight module; and a cable pinboard located on a side frame of the backlight module;

the display control circuit board has a timer control circuit for outputting a timer control signal to the main cell and the sub cell;

the timer control circuit is electrically connected with the main cell through at least one first chip on film (COF); and the timer control circuit is electrically connected with the cable pinboard, and the cable pinboard is electrically connected with the sub cell through at least one second COF.

In an implementation, in the folding screen display device provided by the embodiment of the present disclosure, only a routing wire for transmitting a signal is arranged in the cable pinboard.

In an implementation, in the folding screen display device provided by the embodiment of the present disclosure, a width of the cable pinboard is smaller than a width of the display control circuit board.

In an implementation, in the folding screen display device provided by the embodiment of the present disclosure, the backlight module includes a rubber frame, and the rubber frame has a hollow structure for avoiding the cable pinboard.

In an implementation, in the folding screen display device provided by the embodiment of the present disclosure, the cable pinboard is electrically connected with the display control circuit board through a flexible printed circuit board.

In an implementation, in the folding screen display device provided by the embodiment of the present disclosure, the cable pinboard has a first interface fixedly connected with a socket of one end of the flexible printed circuit board, the display control circuit board has a second interface fixedly connected with a socket of the other end of the flexible printed circuit board, and the first interface and the second interface are arranged in a staggered mode.

In an implementation, in the folding screen display device provided by the embodiment of the present disclosure, one end of the at least one second COF is fixed on a surface of a side, far away from the backlight module, of the sub cell; and the other end of the at least one second COF is fixed on a surface of a side, far away from the side frame of the backlight module, of the cable pinboard; and a chip bound on the at least one second COF is located on a surface of a side, facing the backlight module, of the at least one second COF.

In an implementation, in the folding screen display device provided by the embodiment of the present disclosure, one end of the at least one first COF is fixed on a surface of a side, far away from the sub cell, of the main cell; the at least one first COF is bent along the side frame of the backlight module, and the other end of the at least one first COF is fixed on a surface of a side, far away from the backlight module, of the display control circuit board; and a chip bound on the at least one first COF is located on a surface of a side, facing the side frame of the backlight module, of the at least one first COF.

In an implementation, in the folding screen display device provided by the embodiment of the present disclosure, the number of the first COFs and the number of the second COFs are both multiple.

In an implementation, in the folding screen display device provided by the embodiment of the present disclosure, the timer control circuit includes a first timer control chip and a second timer control chip being mutually independent, the first timer control chip is electrically connected with the at least one first COF, and the second timer control chip is electrically connected with the cable pinboard.

In an implementation, in the folding screen display device provided by the embodiment of the present disclosure, a system on chip (SOC) and a field programmable gate array (FPGA) are further included; and the SOC is electrically connected with the display control circuit board through the FPGA.

In an implementation, in the folding screen display device provided by the embodiment of the present disclosure, the FPGA is integrated in a board card where the SOC is located or arranged in a separate board card.

In an implementation, in the folding screen display device provided by the embodiment of the present disclosure, a SOC electrically connected with the display control circuit board is further included; and the timer control circuit includes a timer control chip and a FPGA.

In an implementation, in the folding screen display device provided by the embodiment of the present disclosure, the display control circuit board has a third interface for receiving a display signal.

In an implementation, in the folding screen display device provided by the embodiment of the present disclosure, the main cell is a color screen with a color resistance, the sub cell is a black-and-white screen, the main cell and the sub cell have same pixel structures, and a scattering film is arranged between the main cell and the sub cell.

DETAILED DESCRIPTION OF THE EMBODIMENTS

Figure 1:
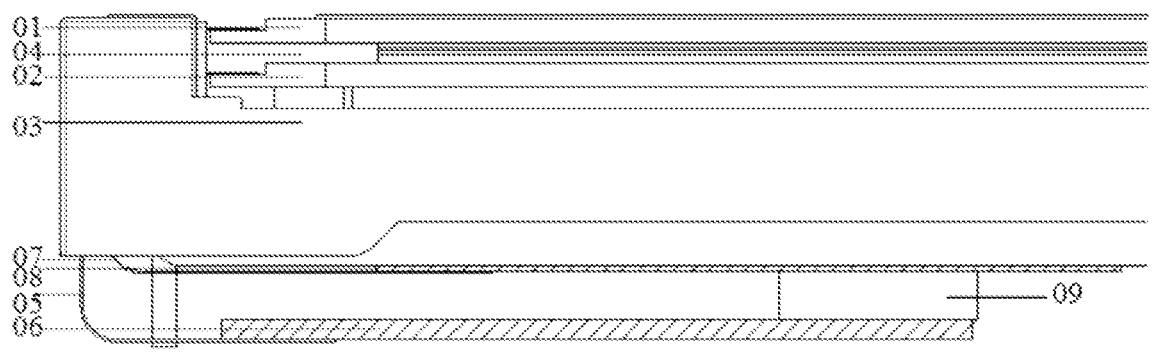
FIG. 1 is a schematic structural diagram of a folding screen display device in the related art.

A current folding screen display product is shown in FIG. 1, and includes a main cell 01, a sub cell 02, a backlight 03, and a scattering film 04 located between the main cell 01 and the sub cell 02. The main cell 01 and the sub cell 02 are controlled by mutually independent driver boards. Specifically, the main cell 01 is connected with a main cell control circuit board 06 through a first COF 05, and the sub cell 02 is connected with a sub cell control circuit board 08 through a second COF 07. The main cell control circuit board 06 and the sub cell control circuit board 08 are fixed in a stacked structure, the sub cell control circuit board 08 is bonded to a backboard through a double-sided adhesive on a bottom layer, and the main cell control circuit board 06 is bonded to the sub cell control circuit board 08 through a double-sided silicone pad 09 on an upper layer. A thickness of a module of the folding screen display product is significantly increased, and a structure is redundant. In addition, for two driver boards, a problem that the driver boards are difficult to be grasped during assembling the module exists. When the main cell control circuit board 06 and the sub cell control circuit board 08 are not fixed, when an equipment suction cup grasps the main cell control circuit board 06, the sub cell control circuit board 08 naturally droops, which is prone to causing damage of the second COF 07, as well as a problem of blocking alignment of a screen and the backlight. When the main cell control circuit board 06 and the sub cell control circuit board 08 are fixed, a weight increases, and it's difficult for the suction cup to adsorb the boards, so equipment needs to be modified to increase an adsorption strength of the suction cup. That is to say, at present, two display screens in a folding screen display product are controlled by independent control circuit boards respectively, so the cost is high, process corresponding is difficult, the thickness of a module is increased, and the risk of productization is high.

Based on the above problems, an embodiment of the present disclosure provides a folding screen display device, one display control circuit board is configured to drive a main cell and a sub cell at the same time, the cost of one driver board is saved, and a process flow is simplified. At the same time, a design of one driver board may reduce a thickness of a module, thereby improving a product conversion rate of the folding screen display device greatly, and achieving thin type folding screen display products with the low cost.

In order to make objectives, technical solutions and advantages of the present disclosure clearer, the present disclosure is further described in detail below in combination with accompanying drawings. Obviously, the embodiments described are only part of embodiments of the present disclosure and not all of the embodiments. Based on the embodiments of the present disclosure, all other embodiments obtained by those of ordinary skill in the art without having performed creative labor are covered by the scope of protection of the present disclosure.

Shapes and sizes of parts in the accompanying drawings do not reflect the true scale and are intended only to indicate contents of the present disclosure.

Figure 2A:
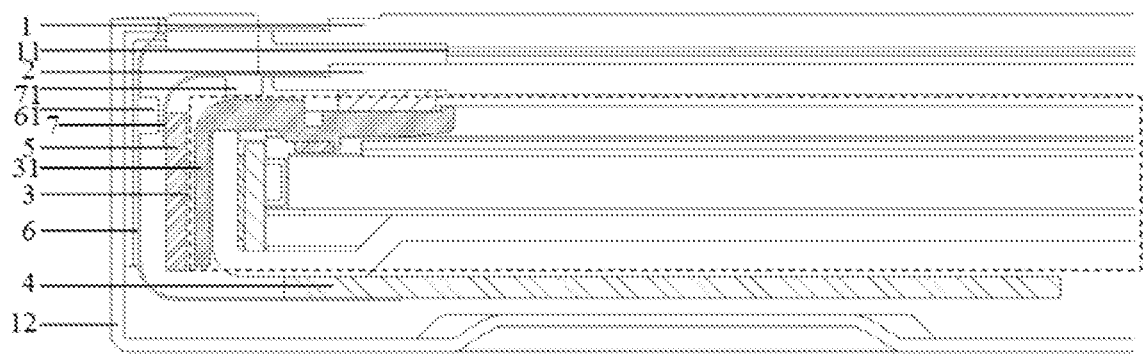
FIG. 2A is a schematic structural diagram of a folding screen display device provided by an embodiment of the present disclosure.

Specifically, a folding screen display device provided by an embodiment of the present disclosure, as shown in FIG. 2A, includes: a main cell 1 and a sub cell 2 arranged in a stacked mode; a backlight module 3 located on a side, facing away from the main cell 1, of the sub cell 2; a display control circuit board 4 located on a side, facing away from the sub cell 2, of the backlight module 3; and a cable pinboard 5 located on a side frame of the backlight module 3;

the display control circuit board 4 is provided with a timer control circuit TCON (timer control register) for outputting a timer control signal to the main cell 1 and the sub cell 2;

the timer control circuit is electrically connected with the main cell 1 through at least one first chip on film (COF) 6; and the timer control circuit is electrically connected with the cable pinboard 5, and the cable pinboard 5 is electrically connected with the sub cell 2 through at least one second COF 7.

Specifically, as shown in FIG. 2A, components of the folding screen display device are all arranged in a shell 12.

Specifically, in the folding screen display device provided by the embodiment of the present disclosure, only one display control circuit board 4 is arranged, the timer control circuit TCON built in the display control circuit board 4 may drive the main cell 1 and the sub cell 2 at the same time, and the cost of one driver board is saved. At the same time, using one display control circuit board 4 may reduce a thickness of a module, a thickness of one driver board and a fixed structure may be reduced structurally, a thin type design is achieved, a product conversion rate of the folding screen display device is greatly improved, and thin type display products with the low cost are achieved. In addition, a design of one display control circuit board 4 solves a problem that the driver boards are difficult to be grasped during assembling the module in a design of dual driver boards. Assembly is transformed from manual alignment bonding to automatic alignment by equipment, which simplifies a process flow and improves a production line activation.

In an implementation, in the folding screen display device provided by the embodiment of the present disclosure, only a routing wire for transmitting a signal is arranged in the cable pinboard 5, namely, the cable pinboard 5 is only responsible for wiring to realize a binding function of the second COF 7 of the sub cell 2. There is no component on the cable pinboard 5, so the cable pinboard 5 may be extremely narrow to facilitate that the cable pinboard 5 is arranged at the side frame of the backlight module 3.

Figure 3:
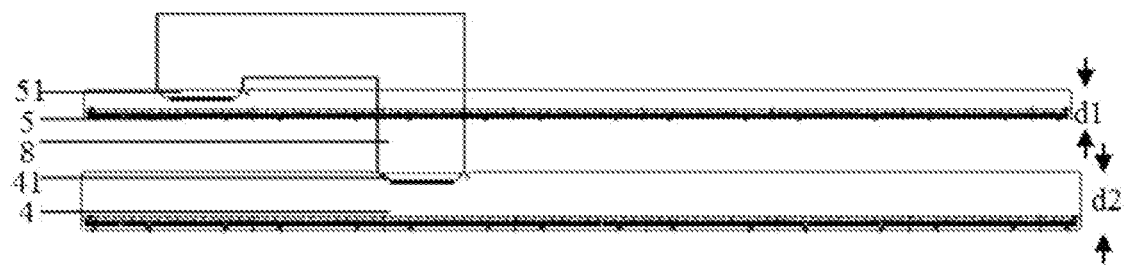
FIG. 3 is a schematic diagram of a connection between a display control circuit board and a cable pinboard in a folding screen display device provided by an embodiment of the present disclosure.

In an implementation, in the folding screen display device provided by the embodiment of the present disclosure, as shown in FIG. 3, a width d1 of the cable pinboard 5 may be smaller than a width d2 of the display control circuit board 4.

Specifically, there is no component on the cable pinboard 5, so the cable pinboard 5 may be extremely narrow. During product design, the width d1 of the cable pinboard 5 may be set to 4.5 mm. Compared with 9 mm of an original width of the sub cell control circuit board, the width is reduced by half, that is, an area is reduced by half, and an integrated circuit (IC) and other components are omitted at the same time.

Figure 2B:
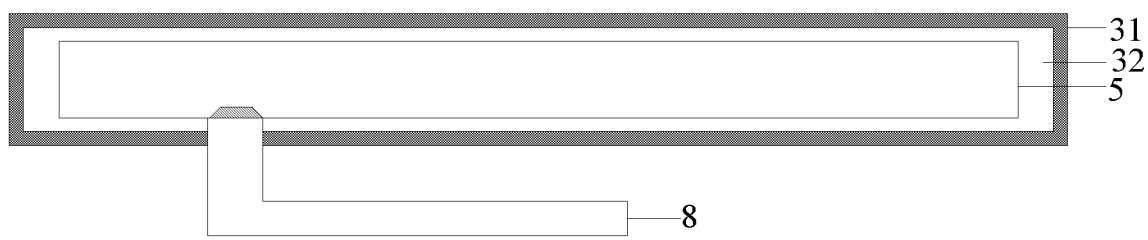
FIG. 2B is a schematic diagram of a relationship between a cable pinboard and a rubber frame in a folding screen display device provided by an embodiment of the present disclosure.

In an implementation, in the folding screen display device provided by the embodiment of the present disclosure, as shown in FIG. 2A, in order to achieve ultra-high contrast ratio display, the backlight module 3 may adopt a side-entry type backlight and local diming. The backlight module 3 includes a rubber frame 31, as shown in FIG. 2B, and the rubber frame 31 may be provided with a hollow structure 32 for avoiding the cable pinboard 5. The backlight module 3 may also include a light guide plate and other components, which will not be detailed here. Specifically, FIG. 2B is a schematic structural diagram of the folding screen display device provided by the embodiment of the present disclosure viewed from a side of the cable pinboard 5.

Specifically, the cable pinboard 5 is fixed at the side frame of the backlight module 3, and the rubber frame 31 is hollowed-out at a position of the cable pinboard 5 for avoiding cable pinboard 5, so as to realize a narrow frame design.

In an implementation, in the folding screen display device provided by the embodiment of the present disclosure, as shown in FIG. 3, the cable pinboard 5 may be electrically connected with the display control circuit board 4 through a flexible printed circuit board 8. Specifically, FIG. 3 is a schematic diagram of the cable pinboard 5 and the display control circuit board 4 in the folding screen display device provided by the embodiment of the disclosure under an expanded state, and does not represent real positions of the cable pinboard 5 and the display control circuit board 4 in the folding screen display device.

Specifically, the cable pinboard 5 and the display control circuit board 4 are respectively connected with the flexible printed circuit board 8 by a way of pin to pin.

In an implementation, in the folding screen display device provided by the embodiment of the present disclosure, as shown in FIG. 3, the cable pinboard 5 may be provided with a first interface 51 fixedly connected with a socket of one end of the flexible printed circuit board 8, the display control circuit board 4 may be provided with a second interface 41 fixedly connected with a socket of the other end of the flexible printed circuit board 8, and the first interface 51 and the second interface 41 are arranged in a staggered mode to facilitate plugging between matching interfaces and sockets. It should be noted that arranging the first interface 51 and the second interface 41 in the staggered mode means that the two interfaces are arranged in the staggered mode in a width direction, that is, in a direction of d, namely, they are not arranged on a vertical line. It may also be considered that the first interface 51 and the second interface 41 are arranged in sequence from left to right in FIG. 3.

Specifically, in the folding screen display device provided by the embodiment of the present disclosure, as a display control board card of the main cell 1 and the sub cell 2, the display control circuit board 4 may integrate the timer control circuit TCON, a power module, a display driving connection and other functions. The display control circuit board 4 may be fixed at a bottom end of a backboard the backlight module 3 by screws or a double-sided adhesive. Compared with an existing structure of dual driver boards, a thickness of one driver board is reduced by 6 mm and a thickness of a pad between the two driver boards is reduced by 3 mm, and thus the thickness is reduced by 9 mm.

In an implementation, in the folding screen display device provided by the embodiment of the present disclosure, as shown in FIG. 2A, one end of the second COF 7 is fixed on a surface of a side, far away from the backlight module 3, of the sub cell 2; after the second COF 7 is bent from the surface of the sub cell 2 to the side frame of the backlight module 3, the other end of the second COF 7 is fixed on a surface of a side, far away from the side frame of the backlight module 3, of the cable pinboard 5; and a chip 71 is bound on the second COF 7. In order to reduce a thickness of a border area of a product, the chip 71 bound on the second COF 7 may be located on a surface of a side, facing the backlight module 3, of the second COF 7; that is, the chip 71 bound on the second COF 7 does not occupy a position of a side edge.

In an implementation, in the folding screen display device provided by the embodiment of the present disclosure, as shown in FIG. 2A, one end of the first COF 6 is fixed on a surface of a side, far away from the sub cell 2, of the main cell 1; after the first COF 6 is bent along the side frame of the backlight module 3 to a rear face of the backlight module 3, the other end of the first COF 6 is fixed on a surface of a side, far away from the backlight module 3, of the display control circuit board 4; and a chip 61 is bound on the first COF 6. In order to reduce a thickness of the product, the chip 61 bound on the first COF 6 is located on a surface of a side, facing the side frame of the backlight module 3, of the first COF 6; that is, the chip 61 bound on the first COF 6 does not increase the thickness of the product.

Figure 4:
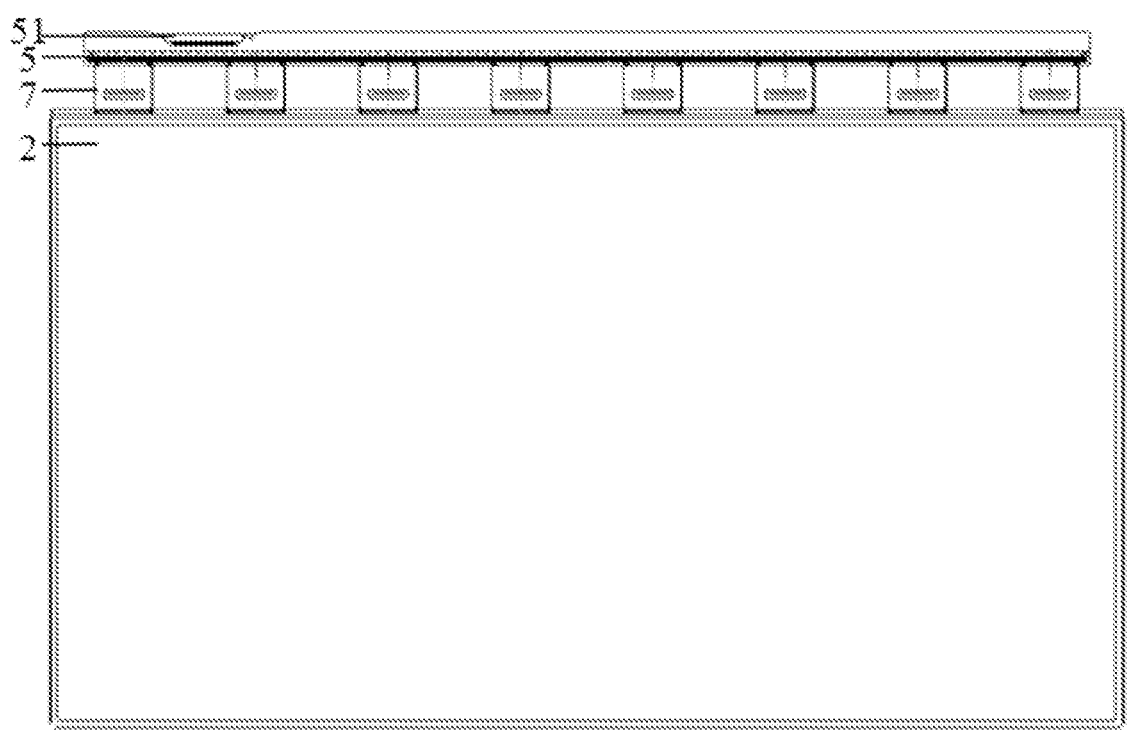
FIG. 4 is a schematic diagram of a connection between a sub cell and a cable pinboard in a folding screen display device provided by an embodiment of the present disclosure.
Figure 5:
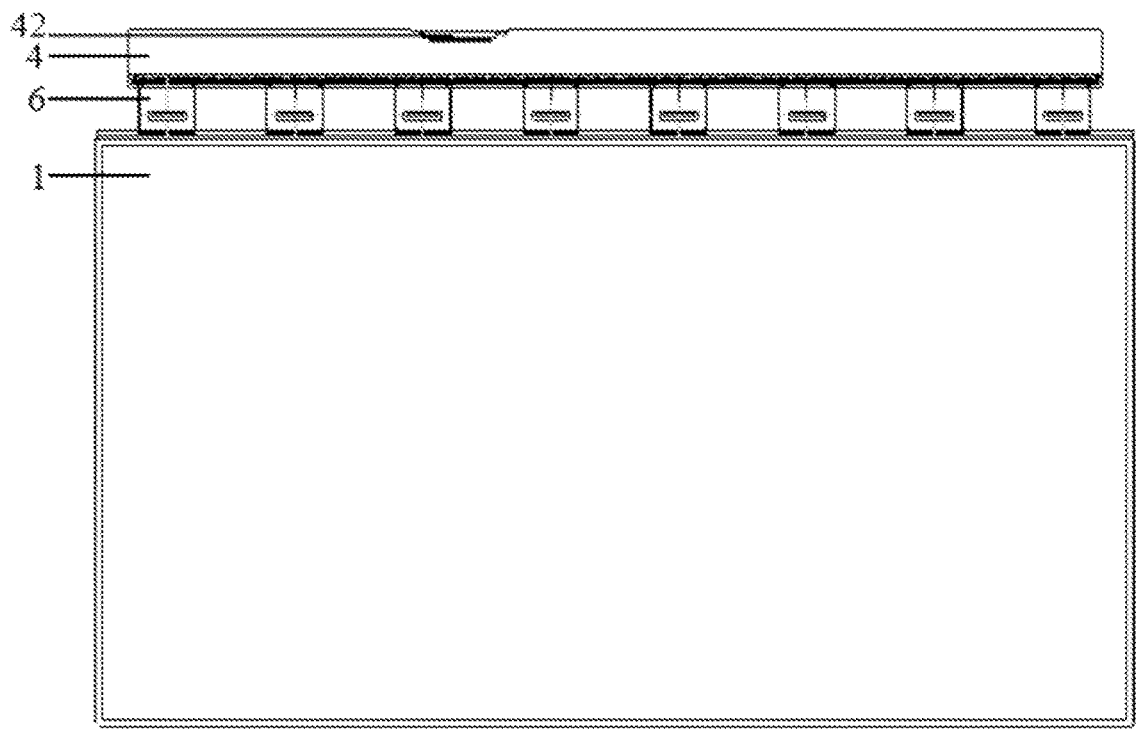
FIG. 5 is a schematic diagram of a connection between a main cell and a display control circuit board in a folding screen display device provided by an embodiment of the present disclosure.

In an implementation, in the folding screen display device provided by the embodiment of the present disclosure, as shown in FIGS. 4 and 5, the number of the first COFs 6 and the number of the second COFs 7 may be both multiple. In FIGS. 4 and 5, that the number of the first COFs 6 and the number of the second COFs 7 are both 8 is taken as an example to illustrate, and each COF is bound with a chip. Moreover, FIG. 4 is a schematic diagram of the sub cell 2, the cable pinboard 5 and the second COFs 7 in the folding screen display device provided by the embodiment of the disclosure under an expanded state, and does not represent real positions of the three in the folding screen display device. FIG. 5 is a schematic diagram of the main cell 1, the display control circuit board 4 and the first COFs 6 in the folding screen display device provided by the embodiment of the disclosure under an expanded state, and does not represent real positions of the three in the folding screen display device.

Figure 6:
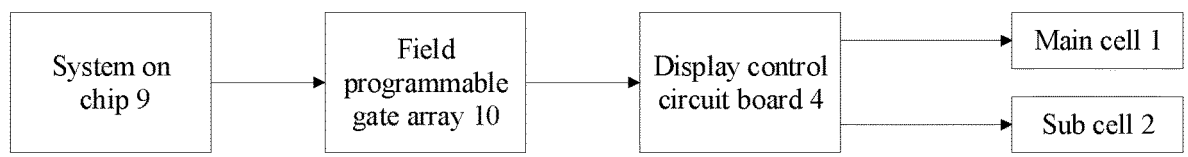
FIG. 6 is a schematic diagram of a driving logic of a folding screen display device provided by an embodiment of the present disclosure.
Figure 7:
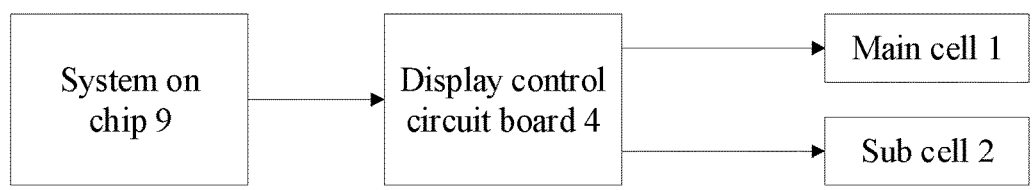
FIG. 7 is a schematic diagram of another driving logic of a folding screen display device provided by an embodiment of the present disclosure.

In an implementation, in the folding screen display device provided by the embodiment of the present disclosure, as shown in FIGS. 6 and 7, a system on chip (SOC) 9 and a field programmable gate array (FPGA) 10 may be further included. The SOC 9 is electrically connected with the display control circuit board 4 through the FPGA 10.

Specifically, the SOC 9 belongs to an overall unit part and is a source of a display signal. The SOC 9 outputs a video signal to the FPGA, and the FPGA, as an algorithm processing unit, outputs an image signal to the display control circuit board 4.

In an implementation, in the folding screen display device provided by the embodiment of the present disclosure, the FPGA 10 may be integrated in a board card where the SOC 9 is located or arranged in a separate board card. FIG. 6 shows a situation that the FPGA 10 is arranged in the separate board card, and FIG. 7 shows the situation that the FPGA 10 is integrated in the SOC 9 or the display control circuit board 4.

In an implementation, in the folding screen display device provided by the embodiment of the present disclosure, as shown in FIG. 5, the display control circuit board 4 may have a third interface 42 for receiving the display signal, so that the display control circuit board 4 receives the display signal after connecting with the SOC 9 of the overall unit part through the third interface 42.

Figure 8:
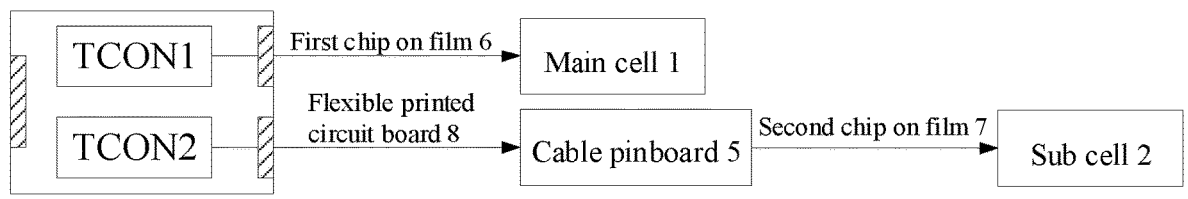
FIG. 8 is a refined schematic structural diagram of a folding screen display device provided by an embodiment of the present disclosure.

In an implementation, in the folding screen display device provided by the embodiment of the present disclosure, as shown in FIG. 8, the timer control circuit in the display control circuit board 4 may include a first timer control chip TCON1 and a second timer control chip TCON2 being mutually independent; that is, two TCON ICs are arranged on the display control circuit board 4. Specifically, the first timer control chip TCON1 is electrically connected with the first COF 6, responsible for display control of the main cell 1, and is directly connected with the main cell 1 through the first COF 6; and the second timer control chip TCON2 is electrically connected with the cable pinboard 5, responsible for display control of the sub cell 2, and is connected with the sub cell 2 through the cable pinboard 5 and the second COF 7.

Figure 9:
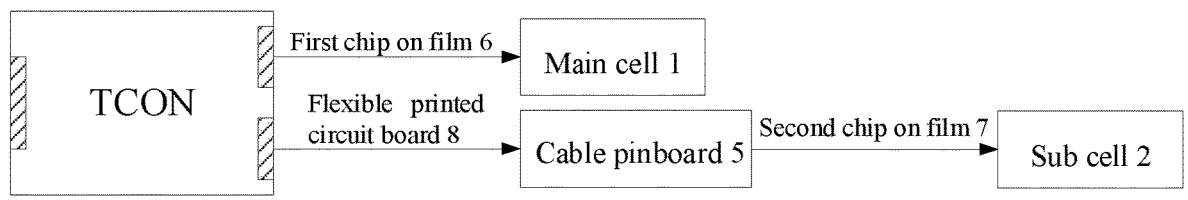
FIG. 9 is another refined schematic structural diagram of a folding screen display device provided by an embodiment of the present disclosure.

Or, in the folding screen display device provided by the embodiment of the present disclosure, as shown in FIG. 9, the timer control circuit in the display control circuit board 4 may include a timer control chip TCON and a function of the integrated FPGA. At this point, the SOC 9 outputs a video signal to the display control circuit board 4, and the TCON IC on the display control circuit board 4 outputs two timer control signals at the same time to achieve display control of the main cell 1 and the sub cell 2 respectively.

In an implementation, in the folding screen display device provided by the embodiment of the present disclosure, as shown in FIG. 1, the main cell 1 is a color screen with a color resistance, the sub cell 2 is a black-and-white screen, the main cell 1 and the sub cell 2 have same pixel structures, and a scattering film 11 is provided between the main cell 1 and the sub cell 2.

Specifically, when the main cell 1 and the sub cell 2 are made of independent masks, the pixel structure of the main cell 1 and the pixel structure of the sub cell 2 may be ensured to be different, and a problem that moire patterns are caused by structural interference generated when the pixel structures of the two cells are consistently is avoided. But adopting independent masks will lead to the high development cost of the folding screen display device. Therefore, in order to reduce the production cost, the main cell 1 and the sub cell 2 may be mass-produced by using the same mask, the pixel structure of the main cell 1 is the same as that of the sub cell 2, and in addition, the scattering film 11 is added between the main cell 1 and the sub cell 2, so as to solve the problem of the moire patterns caused by the same pixel structures.

According to the folding screen display device provided by the embodiment of the present disclosure, only one display control circuit board is arranged, the timer control circuit built in the display control circuit board may drive the main cell and the sub cell at the same time, and the cost of one driver board is saved. At the same time, adopting one display control circuit board may reduce the thickness of the module, the thickness of one driver board and the fixed structure may be reduced structurally, the thin type design is achieved, the product conversion rate of the folding screen display device is greatly improved, and thin type display products with the low cost are achieved. In addition, the design of one display control circuit board solves the problem that the driver boards are difficult to be grasped during assembling the module in the design of the dual driver boards. Assembly is transformed from manual alignment bonding to automatic alignment by equipment, which simplifies the process flow and improves the production line activation.

It is obvious that those of skill in the art may make various modifications and variations of the present disclosure without leaving the spirit and scope of the present disclosure. Thus, if such modifications and variations of the present disclosure fall within the scope of the claims of the present disclosure and their equivalents, the present disclosure is also intended to include such modifications and variations.

What is claimed is:

1. A folding screen display device, comprising:
a main cell and a sub cell arranged in a stacked mode;
a backlight module arranged on a side, facing away from the main cell, of the sub cell;
a display control circuit board arranged on a side, facing away from the sub cell, of the backlight module; and
a cable pinboard arranged on a side frame of the backlight module;
wherein the display control circuit board has a timer control circuit for outputting a timer control signal to the main cell and the sub cell;
the timer control circuit is electrically connected with the main cell through at least one first chip on film (COF);
the timer control circuit is electrically connected with the cable pinboard; and
the cable pinboard is electrically connected with the sub cell through at least one second COF.

2. The folding screen display device according to claim 1, wherein only a routing wire for transmitting a signal is arranged in the cable pinboard.

3. The folding screen display device according to claim 2, wherein a width of the cable pinboard is smaller than a width of the display control circuit board.

4. The folding screen display device according to claim 1, wherein the backlight module comprises a rubber frame, and the rubber frame has a hollow structure for avoiding the cable pinboard.

5. The folding screen display device according to claim 1, wherein the cable pinboard is electrically connected with the display control circuit board through a flexible printed circuit board.

6. The folding screen display device according to claim 5, wherein the cable pinboard has a first interface fixedly connected with a socket of one end of the flexible printed circuit board;
the display control circuit board has a second interface fixedly connected with a socket of the other end of the flexible printed circuit board; and
the first interface and the second interface are arranged in a staggered mode.

7. The folding screen display device according to claim 1, wherein one end of the at least one second COF is fixed on a surface of a side, far away from the backlight module, of the sub cell;

the other end of the at least one second COF is fixed on a surface of a side, far away from the side frame of the backlight module, of the cable pinboard; and a chip bound on the at least one second COF is arranged on a surface of a side, facing the backlight module, of the at least one second COF.

8. The folding screen display device according to claim 1, wherein one end of the at least one first COF is fixed on a surface of a side, far away from the sub cell, of the main cell;

the at least one first COF is bent along the side frame of the backlight module;

the other end of the at least one first COF is fixed on a surface of a side, far away from the backlight module, of the display control circuit board; and a chip bound on the at least one first COF is arranged on a surface of a side, facing the side frame of the backlight module, of the at least one first COF.

9. The folding screen display device according to claim 1, wherein the timer control circuit comprises a first timer control chip and a second timer control chip being mutually independent;

the first timer control chip is electrically connected with the at least one first COF; and the second timer control chip is electrically connected with the cable pinboard.

10. The folding screen display device according to claim 9, further comprising: a system on chip (SOC) and a field programmable gate array (FPGA);

wherein the SOC is electrically connected with the display control circuit board through the FPGA.

11. The folding screen display device according to claim 10, wherein the FPGA is integrated in a board card where the SOC is arranged or arranged in a separate board card.

12. The folding screen display device according to claim 1, further comprising: a SOC electrically connected with the display control circuit board;

wherein the timer control circuit comprises a timer control chip and a FPGA.

13. The folding screen display device according to claim 9, wherein the display control circuit board has a third interface for receiving a display signal.

14. The folding screen display device according to claim 1, wherein the main cell is a color screen with a color resistance, the sub cell is a black-and-white screen, the main cell and the sub cell have same pixel structures, and a scattering film is arranged between the main cell and the sub cell.

* * * * *